United States Patent
Jahr (10) Patent No.: US 11,109,201 B2
(45) Date of Patent: Aug. 31, 2021

(54) DEVICE AND METHOD FOR PROVISIONING SERVICES TO MOBILE COMMUNICATION DEVICE

(71) Applicant: Giesecke+Devrient Mobile Security America, Inc., Dulles, VA (US)

(72) Inventor: Christoph Jahr, Asburn, VA (US)

(73) Assignee: Giesecke+Devrient Mobile Security America, Inc., Dulles, VA (US)

( * ) Notice: Subject to any disclaimer, the term of this patent is extended or adjusted under 35 U.S.C. 154(b) by 733 days.

(21) Appl. No.: 15/884,811

(22) Filed: Jan. 31, 2018

(65) Prior Publication Data

US 2019/0239042 A1 Aug. 1, 2019

(51) Int. Cl.
| | |
|---|---|
| *H04W 12/04* | (2021.01) |
| *H04W 4/50* | (2018.01) |
| *G06Q 20/08* | (2012.01) |
| *H04L 29/06* | (2006.01) |

(52) U.S. Cl.
CPC ............. *H04W 4/50* (2018.02); *G06Q 20/085* (2013.01); *H04L 63/061* (2013.01); *H04W 12/04* (2013.01); *H04L 63/0272* (2013.01)

(58) Field of Classification Search
CPC ......... H04W 4/80; H04W 8/183; H04W 8/20; H04W 12/08; H04W 8/18
See application file for complete search history.

(56) References Cited

U.S. PATENT DOCUMENTS

| | | | | |
|---|---|---|---|---|
| 2007/0299941 A1* | 12/2007 | Hietasarka | .......... | H04L 61/3025 709/220 |
| 2009/0327398 A1* | 12/2009 | Campbell | ............... | H04L 63/08 709/202 |
| 2018/0139602 A1* | 5/2018 | Chastain | ................. | H04W 8/26 |

* cited by examiner

*Primary Examiner* — Michael T Vu
(74) *Attorney, Agent, or Firm* — Faegre Drinker Biddle & Reath LLP (57) ABSTRACT

Techniques are disclosed which can allow a mobile device, which is no longer being updated by the device manufacturer, to receive updates from the manufacturer. In an implementation, an international mobile equipment identity (IMEI) is received from the mobile device that identifies a model of the mobile device. The mobile device can have at least one application that is unable to communicate with a server of the mobile device's manufacturer. A provisioning server may determine that the mobile device is depreciated based upon the IMEI, and obtain a key unique to the mobile device. The key and at least one Access Point Name may be transmitted to the mobile device, which can allow the mobile device to direct its data traffic to the server of the manufacturer.

20 Claims, 8 Drawing Sheets

DEVICE AND METHOD FOR PROVISIONING SERVICES TO MOBILE COMMUNICATION DEVICE

BACKGROUND

A mobile phone is typically registered on a mobile network utilizing a subscriber identification module (SIM) circuit, which can be a separate card or integrated in the hardware of a given device (e.g., an eSIM). The SIM can contain a unique identification number, authentication information, and/or other information that authenticate and identify a subscriber (e.g., the mobile device) on a mobile carrier's network. SIM cards can have an application that communicates with the device and/or network. An international mobile equipment identity (IMEI) can be a number utilized by a carrier network (e.g., GSM, CDMA, TDMA, LTE, 5G, and potential successor wireless networks utilizing devices employing IMEIs, etc.) to identify a valid device. The IMEI is associated with the device, as opposed to the subscriber.

A primary network operator (e.g., Verizon®) may have a relationship with the mobile device manufacturer in contrast to secondary or tertiary network operators which do not have a relationship with the device manufacturer. Mobile devices are frequently purchased as new and used on a primary network operator by a primary network operator. After a period of time and/or use with the primary network operator, possibly refurbished and repackaged for use with a secondary or tertiary network operator. In developing or secondary or tertiary markets, consumers typically do not pay the relatively high premium for current devices (e.g., Africa, South America, Jamaica, etc.). This has contributed to the increased volume of sales of phones that are 1-5 years old with secondary and tertiary network operators. Moreover, after expiration of an initial device contract with the primary network operator, a user may wish to use a different network operator.

While in use with the primary network operator, a mobile device and software operating thereon may be updated, for example, if the carrier network has contracted with the device manufacturer to do so. When the mobile device is sold for use with a secondary or tertiary network operator, however, the mobile device may be operated on a mobile virtual network operator (MVNO), which can be a wireless communications provider that does not own the wireless network infrastructure over which the MVNO provides its service. As noted above, such networks or the like may not have an agreement with the device manufacturer. Accordingly, these mobile devices may not have full access to network services due to the lack of support by the device manufacturer. For example, a particular Access Point Name (APN) may be blocked for the device. An APN may refer to a connection between a mobile network and another computer network such as the Internet. Examples of APNs include the Internet, Wireless Application Protocol (WAP), Multimedia Messaging Service (MMS), WiFi, etc. Some APNs may be blocked from updating for a device, which can render the device less functional. As an example, Apple Inc.® can block MMS updates on older model iPhones®, which can prevent the MMS application from receiving messages and thereby rendering group messaging or chatting and/or Facetime® as nonfunctional or with a subpar user experience. Other applications may also be adversely affected by this as well. Thus, it would be advantageous to have a mechanism to provision devices that cannot communicate with the APN.

One proposed solution to the aforementioned issues is to (1) insert the SIM card from a mobile carrier network into a device, and (2) after entering the cellular data settings, remove the SIM card and insert the MVNO SIM. The APN can be changed to the MVNO-relevant APN. This process, however, has only mixed success, and MMS is still not updated thereby rendering group and/or picture messaging as inelegant. Another proposed solution is to manually install a profile on a device. This approach also does not solve issues related to MMS. Another proposed solution requires a user to jailbreak the device, which removes software restrictions imposed by the device manufacturer, and direct the subscriber to a jailbreaking resource site from which the mobile subscriber can find the relevant jailbreak source. Jailbreaking is also not a practical fix as this typically requires some technical aptitude and is also prone to risks that could render the device inoperable. Another example of how obtain full usability is by way the use of over-the-top MMS applications. Such applications allow the mobile subscriber to have MMS capabilities, but are not seamlessly integrated into the mobile device, thereby not making them easy to use. Examples of such over-the-top applications include MMSFree, PixDrop, and iSendMMS. The process of jailbreaking a phone is not user friendly, may raise legal issues, and may not solve the above issues. Thus, none of the above-proposed solutions fully addresses the issue of providing complete support for depreciated devices. Moreover, the inability to update depreciated devices result in an increased amount of customer care calls at the MVNO, which leads to subscriber customer frustration and dissatisfaction, along with increased costs and expense for the MVNO in handling the customer care calls.

SUMMARY

According to an embodiment, a system is disclosed that includes a non-transitory memory and one or more hardware processors coupled thereto. The non-transitory memory may be configured to store data associated with a model of one or more mobile devices made by a manufacturer. The one or more hardware processors may be configured to read instructions from the non-transitory memory to cause the system to perform operations. An international mobile equipment identity (IMEI) may be received from the mobile device that identifies a model of the mobile device. The mobile device having at least one application that is unable to communicate with a server of a manufacturer of the mobile device. A provisioning server may determine a mobile device is depreciated based upon, for example, the IMEI, and obtain a key unique to the mobile device, which may include at least one Access Point Name (APN). The key may be then transmitted to the mobile device. The APN may direct the mobile device's traffic to the server of the manufacturer. The implementations disclosed herein may improve functionality and usage of depreciated mobile devices, reduce customer care calls and associated support costs for carriers, and ease subscriber frustration, among other benefits.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Disclosed are techniques which can allow a mobile device (e.g., a smartphone, tablet, or the like), which is no longer being updated by the device manufacturer, to receive updates from the manufacturer. For example, as many devices purchased new in the United States and other highly developed nations age or become obsolete for use with the respective primary network operator, the devices may be used with secondary and tertiary network operators where individuals are generally unwilling or unable to afford the price of the newest device from the manufacturer. The manufacturer can depreciate the device, meaning that the device can no longer receive updates from the manufacturer. A depreciated mobile device may refer to a mobile device for use with a network operator that does not have a relationship with the device manufacturer for automatically configuring the device to receive software updated from the device manufacturer. For example, a mobile device may be purchased brand new. The manufacturer of this mobile device may have a relationship with primary network operator A, but not network operator B. If the user of this mobile device elects to operate the phone on network of network operator B, the mobile device may be deemed "depreciated." In general, the network operator B may be a second or tertiary network operator. As mentioned earlier, a secondary or tertiary network operator does not have an arrangement with the manufacturer to provide manufacturer updates. Thus, the device, when operated on the service provider's mobile network may be capable of engaging in voice communication (e.g., conventional telephony), or browsing the Internet, but applications specific to the manufacturer may no longer function properly. As an example the MMS application may be disabled, meaning that some features of the MMS application may not be functional, or the entire application may be non-functional. The inability to communicate with the manufacturer can be attributed to a lack of an APN which can direct the mobile devices traffic to the appropriate address of the manufacturer, thereby enabling communication between the mobile device's application and the manufacturer. Thus, the user can have the full experience of the manufacturer's device as it was originally intended.

Figure 1:
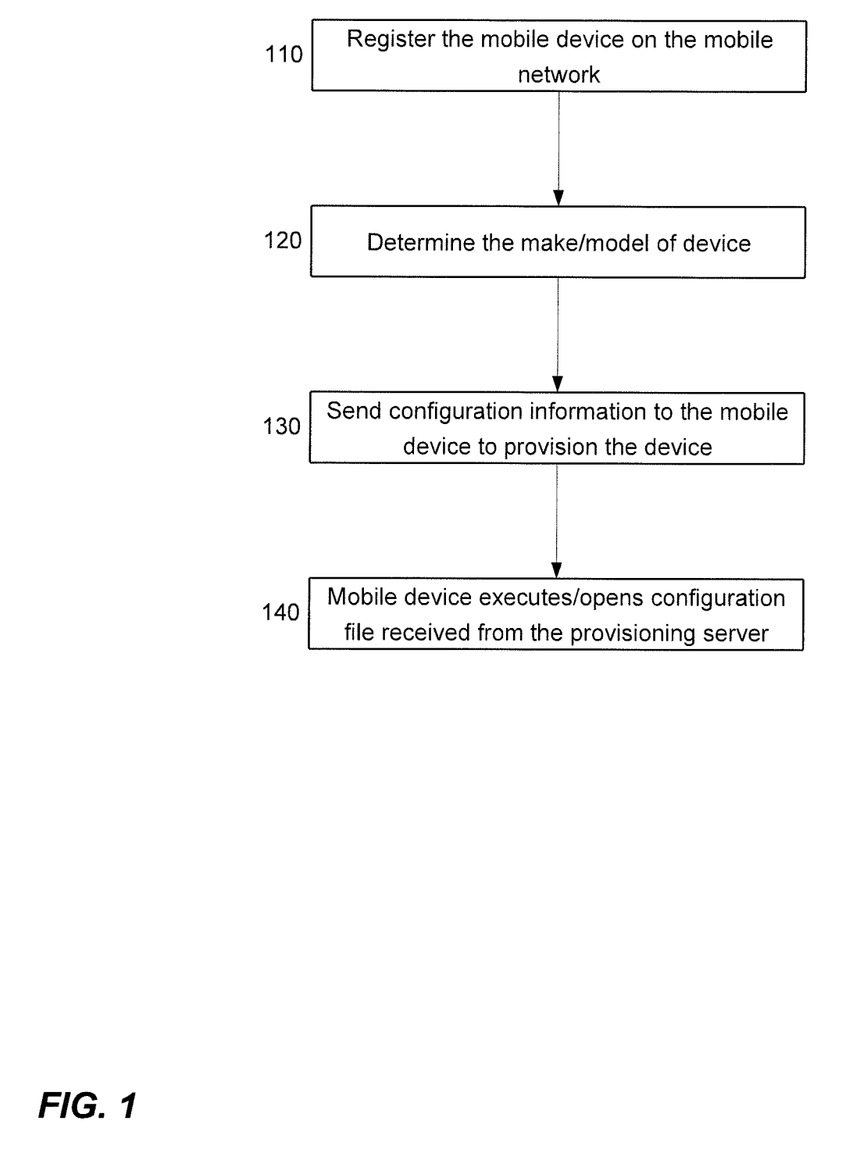
FIG. 1 is an example a process for provisioning a mobile device on a mobile network according to a disclosed implementation.

FIG. 1 is an example of overview of provisioning a mobile device on a mobile network. At 110, when a user first obtains a mobile device, the mobile device can be registered on a mobile network of a service provider using the information stored on a SIM circuit. For example, using a network probe or IMEI tracking applet on the SIM, IMEI information can be captured. An IMEI may be sent to a provisioning server when the mobile device is registered on the service provider's mobile network for the first time, or when the subscriber inserts the SIM containing the IMEI tracking application into a new/different wireless handset. The IMEI may be utilized to identify the make and model of the device at 120. This may be received by the provisioning server as a request to provision the mobile device. A payload that includes information for provisioning the mobile device may be delivered to the device over the mobile network from the provisioning server at 130. The mobile device may execute or "open" the configuration payload that is sent by the provisioning server at 140. This process may occur automatically on the mobile device or without any prompting by an operator of the mobile device. The payload may configure, for example, APNs, WAPs, the Internet, MMS, etc. on the device using a protocol specified by the manufacturer of the mobile device.

Figure 2:
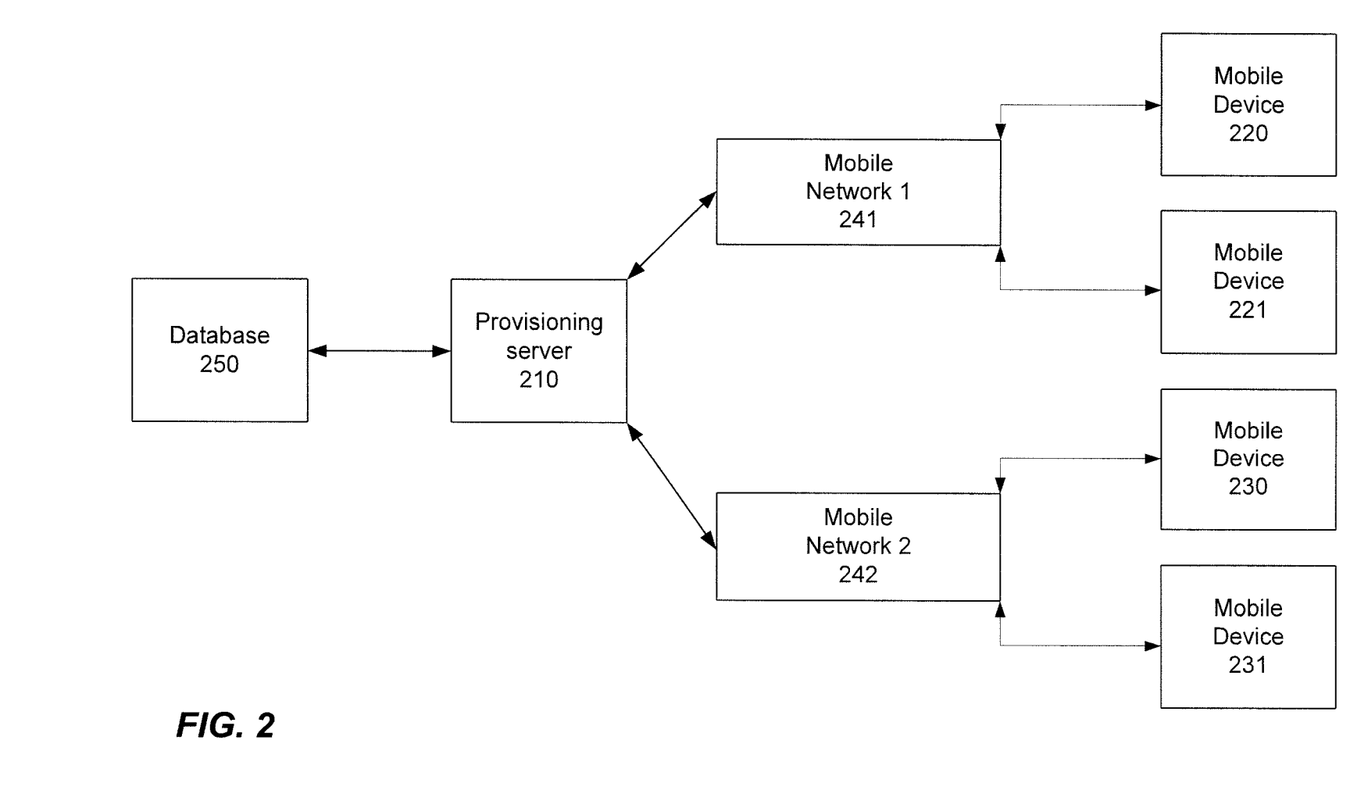
FIG. 2 is a schematic diagram that shows an example arrangement of a system that includes a provisioning server, a mobile device, and a mobile network according to the disclosed implementations herein.

FIG. 2 shows an example arrangement of a system that includes a provisioning server, a mobile device, and a mobile network. The provisioning server 210 provides an ability to update settings on the mobile device 220, 221, 230, 231. For example, it can be a messaging gateway that sends updates to mobile devices 220, 221, 230, 231. The provisioning server 210 may receive requests from mobile devices 220, 221, 230, 231 on multiple mobile networks 241, 242. Provisioning server 210 may be in communication with one or more databases 250 (e.g., a non-transitory memory) which can store information or data about the configuration of mobile devices. For example, database 250 may store information about the hardware that is in a particular mobile device 220, 221, 230, 231 including the make and model of a device, camera type and capability, screen size and/or resolution, band class(es) supported by mobile devices 220, 221, 230, 231. Database 250 may also store APN information that may be preconfigured and downloaded onto the device at the time the device is registered on mobile network 241, 242, and provisioning server 210 receives a request to provision device 220, 221, 230, 231. Provisioning server 210 may specify the aforementioned information and an identified protocol (e.g., Open Mobile Alliance (OMA) protocol) to update one or more of an APN, a wireless access point (WAP), Internet, and MMS settings on mobile device 220, 221, 230, 231.

Figure 3:
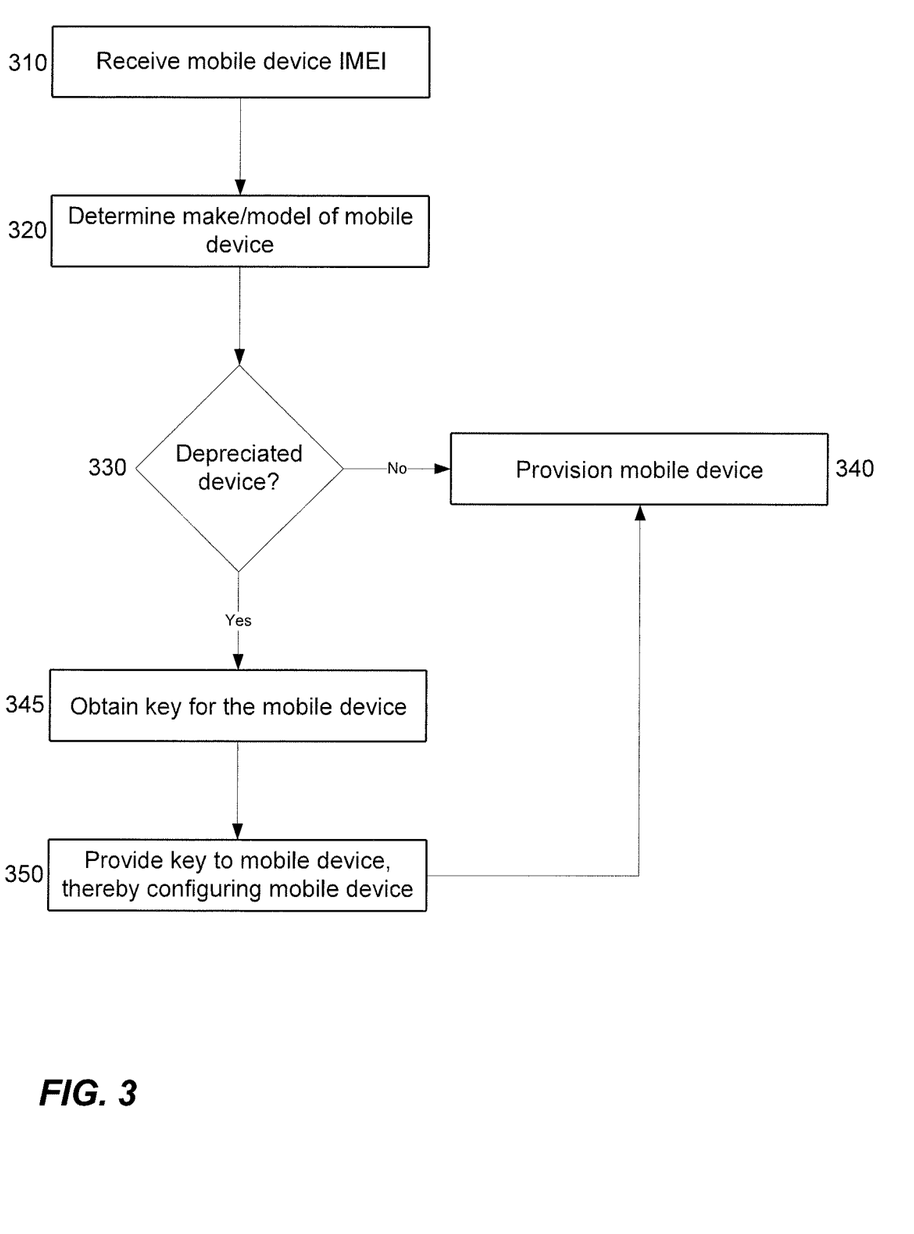
FIG. 3 is an example of a computer-implemented process to obtain updates from the manufacturer for a depreciated mobile device according to an implementation disclosed herein.

FIG. 3 is an example of a computer-implemented process to obtain updates from the manufacturer for a depreciated mobile device. A depreciated mobile device may refer to a device that is no longer supported by the manufacturer of the mobile device such that the mobile device no longer receives updates from the manufacturer. For example, the device may not receive APN updates, and this may render a MMS application as disabled. In some instances, the device may be beyond a particular age (two, three, or four or more years old) at which the device manufacturer no longer plans to support the device with further updates. As mentioned earlier, the device may have an application that requires communication with a server of the manufacturer in order for one or more features of the application, or the application itself, to function as it did when the depreciated device was new. Because the depreciated mobile device may no longer communicate with the manufacturer's server, the data traffic for the one or more disabled applications operating on the mobile device may not be properly routed to such server. In addition to a depreciated mobile device, this process may also be implemented for a mobile device for use with a network operator that does not have a relationship with the device manufacturer for automatically configuring the device to receive software updated from the device manufacturer.

Depreciated devices can be used with virtually all types of network operators. These devices are particularly prevalent in use with secondary or tertiary network operators in markets such as the Carribean or Africa, where the general population may not be willing to pay, or capable of paying, high premiums for the latest mobile device. Furthermore, even in developed markets, MVNOs may have depreciated devices. Thus, when a request is received from a mobile device in one of these markets or on an MVNO, the device may be provisioned by a provisioning server as disclosed herein.

At 310, a mobile device may have one or more applications that are unable to communicate with a server of a manufacturer of the mobile device (e.g., at least some features or the application itself is disabled). An IMEI may be received from the mobile device via the mobile network at 310. The IMEI may be used to determine the make and/or model of the mobile device and may be unique to the mobile device at 320. For example, the provisioning server in FIG. 2 may receive the IMEI number as part of a request to provision the mobile device. The provisioning server may query the database to ascertain the make and model of the device. In response to the query, the database may return an indication of the age of the mobile device. The indication of the age of the mobile device may be raw age represented by the difference of the time of the request to provision the device and when the device was first manufactured. The indication of age may be based upon the model number of the device. For example, a brand of smartphones may have smartphone model 1, model 2 . . . model n. The provisioning server and/or database may have predetermined that model 1 and model 2 are considered depreciated devices. A cutoff for the age of mobile device or what models are considered depreciated may be programmed into the database. Thus, the provisioning server may determine that the mobile device is a depreciated device based upon the information stored in the database that is retrieved with the IMEI at 330. In the event that the mobile device is determined not to be depreciated, then the device may be provisioned as described earlier with regard to FIG. 1 at 340.

If, however, the mobile device is determined to be depreciated, then a key may be obtained at 345. The key may include an APNs for the manufacturer of the mobile device that may allow a data stream for a particular application operating on the mobile device to communicate with the manufacturer's server. More specifically, in some mobile devices, a manufacturer may provide one or more applications on the mobile device, such as an MMS application. When the mobile device becomes depreciated by the manufacturer, these applications may no longer have complete functionality. The key, when downloaded to the mobile application as a part of the payload, as described below, or separately, may cause the mobile device to insert an APN so that the mobile device knows where to send traffic for the manufacturer. Upon download of the key, one or more processors of the mobile device may execute machine readable code associated with the key that causes a session to initiate on the mobile device. During the session, the APN for the manufacturer may be inserted. Subsequent to insertion of the APN, the session may terminate or close, and in some instances, the key may be deleted from the mobile device.

Figure 4:
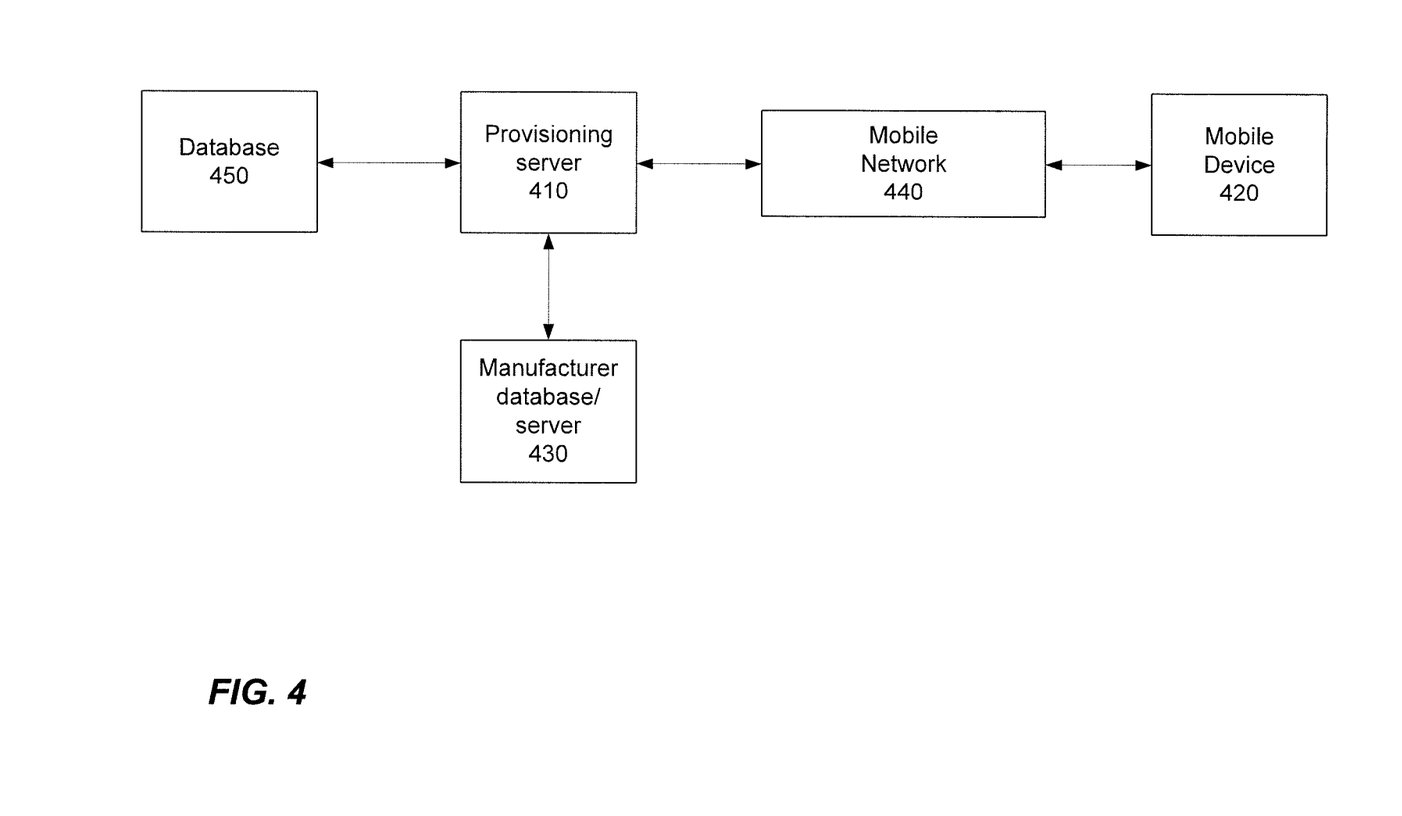
FIG. 4 is a schematic diagram of an exemplary configuration of a system that includes a provisioning server, a mobile device, a manufacturer's server including a database, a mobile network, and a database in communication with the provisioning server according to an implementation disclosed herein.

In some configurations, the key may be stored in the database associated with the provisioning server similar to database 250 in FIG. 2. In some configurations, the key can be obtained from the manufacturer of the mobile device. FIG. 4 is an example configuration of a system that includes a provisioning server 410, a mobile device 420, a manufacturer's server including a database 430, a mobile network 440, and a database in communication with the provisioning server 450. More than one mobile device 420 and/or mobile network may be in communication with provisioning server 410. In this example, the provisioning server may communicate with manufacturer's server 430 over an electronic network such as the Internet. The electronic network may be a secure connection such as a virtual private network (VPN). Provisioning server 410 may transmit a request to manufacturer 430 over the electronic network for the key unique to mobile device 420. For example, provisioning server 410 may communicate one of the model of device 420 and/or the IMEI for device 420 to manufacturer's server 430. Responsive to the request, provisioning server 410 may receive the key from manufacturer 430. In some implementations, manufacturer 430 may require authentication of provisioning server 410 for security purposes.

Regardless of whether the key is obtained at 345 from a database of the provisioning server as in FIG. 2, or a database under control of the manufacturer as in FIG. 4, the key, which can include at least one Access Point Name (APN), may be transmitted to the mobile device at 350. The APN may direct the mobile device's traffic to the server of the manufacturer such that a previously disabled application has functionality restored. For example, in the case of MMS, it may render group messaging or video chat as functional features, or as function as they were when the mobile device was new. The device may be provisioned at 340.

Figure 5A:
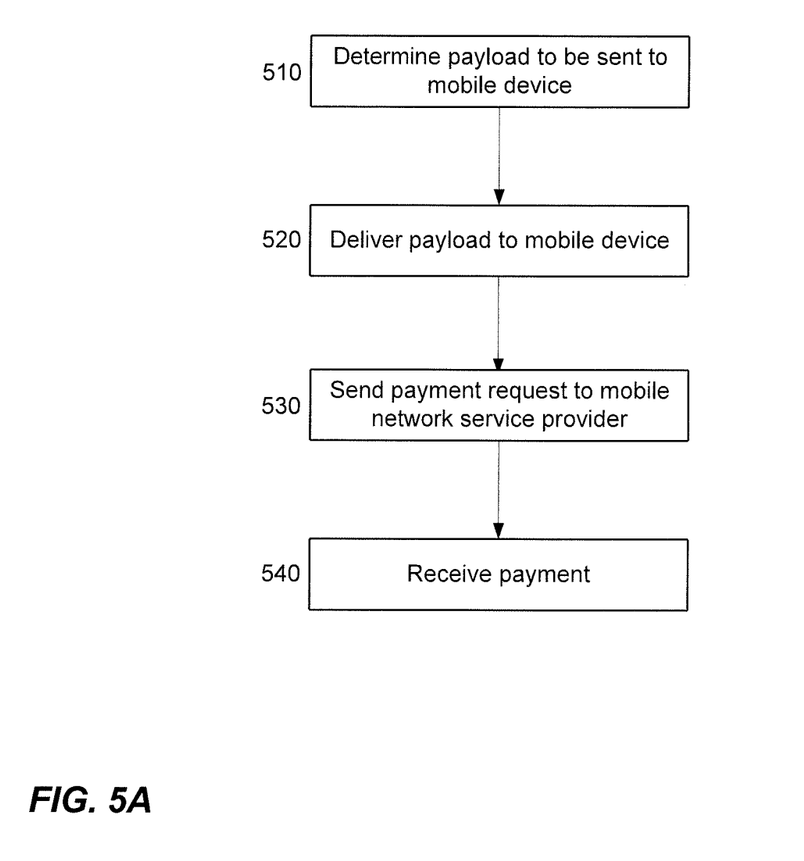
FIG. 5A is an example of payment processing when the key is provided by the database associated with the provisioning server as disclosed herein.
Figure 5B:
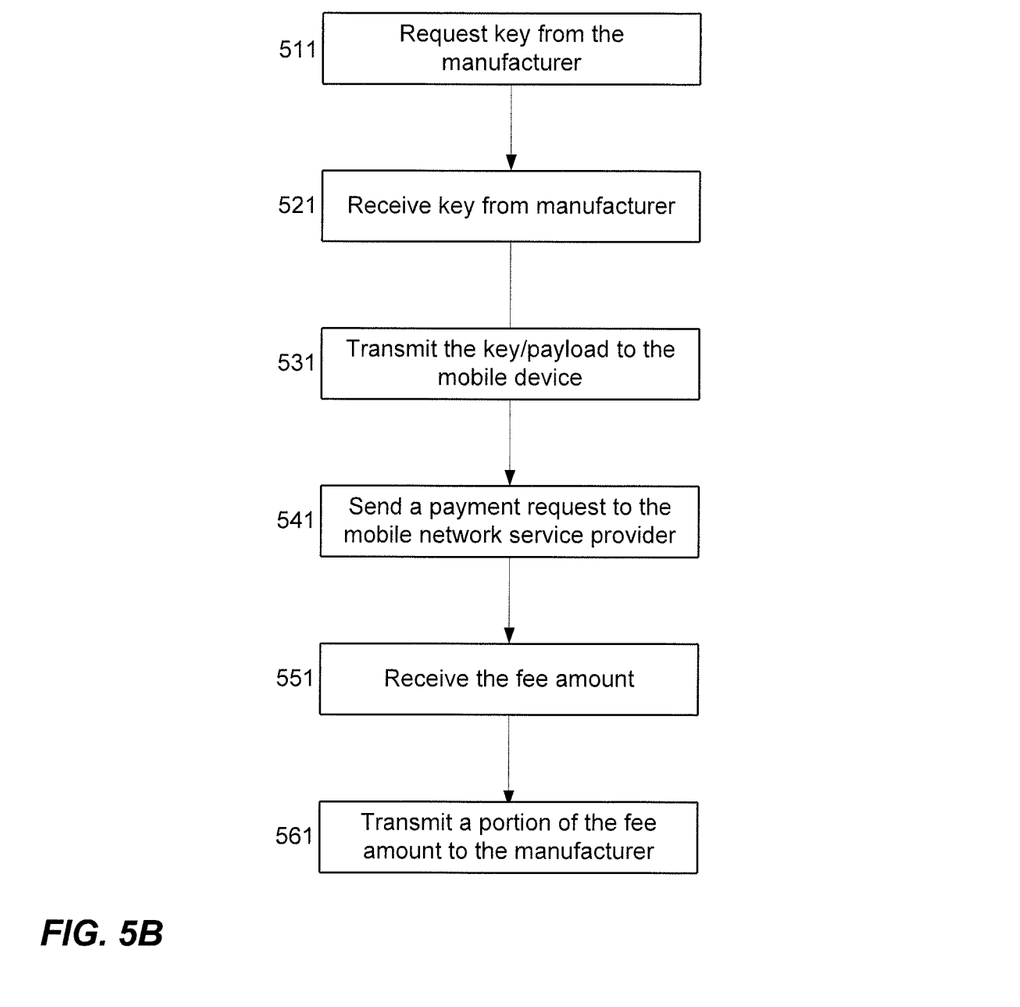
FIG. 5B is an example of payment processing when the key is provided by the database associated with the manufacturer of the mobile device and then sent to the mobile device by the provisioning server according to implementations disclosed herein.

FIG. 5A is an example of payment processing when the key is provided by the database associated with the provisioning server, and FIG. 5B is an example of payment processing when the key is provided by the database associated with the manufacturer of the mobile device and then sent to the mobile device by the provisioning server. In FIG. 5A, the payload sent to the mobile device, which may include the device's configuration set-up and which may include the key, can be determined at 510. The payload, optionally including the key, may be delivered to the mobile device at 520 as described earlier. In some instances, at this stage of the process, an indication may be sent to the provisioning server that the payload was downloaded by the mobile device and/or that the configuration of the mobile device was successful. A payment request may be sent to the mobile network service provider at 530. The payment request may specify a fee amount based upon successful retrieval of the key by the mobile device. At 540, a payment may be received by the provisioning server from the service provider.

In FIG. 5B, as described above, the provisioning server may request the key from the manufacturer at 511, and responsive to the request, the manufacturer may send a key to the provisioning server at 521. The provisioning server may transmit the key and/or payload to the mobile device at 531. In some instances, for FIG. 5A or 5B, a single package including the key and configuration may be sent as a payload, while in other instances there may be separate transmission of the key and the configuration payload. In FIG. 5B, as described earlier with regard to FIG. 5A at this stage of the process, an indication may be sent to the provisioning server that the payload was downloaded by the mobile device and/or that the configuration of the mobile device was successful (indicating that the device was able to communicate with the manufacturer's server). At 541, the provisioning server may send a payment request to the mobile network service provider, which specifies a fee amount for successful retrieval of the key. The provisioning server may receive the fee amount at 551. A portion of the fee amount may be transmitted to the manufacturer at 561.

In some instances, an indication may be sent to the manufacturer that the key has been successfully downloaded for the mobile device. This may provide the manufacturer with the ability to track the keys that have been requested so that the manufacture can independently verify that the provisioning server has requested the keys and to expect payment.

Figure 6:
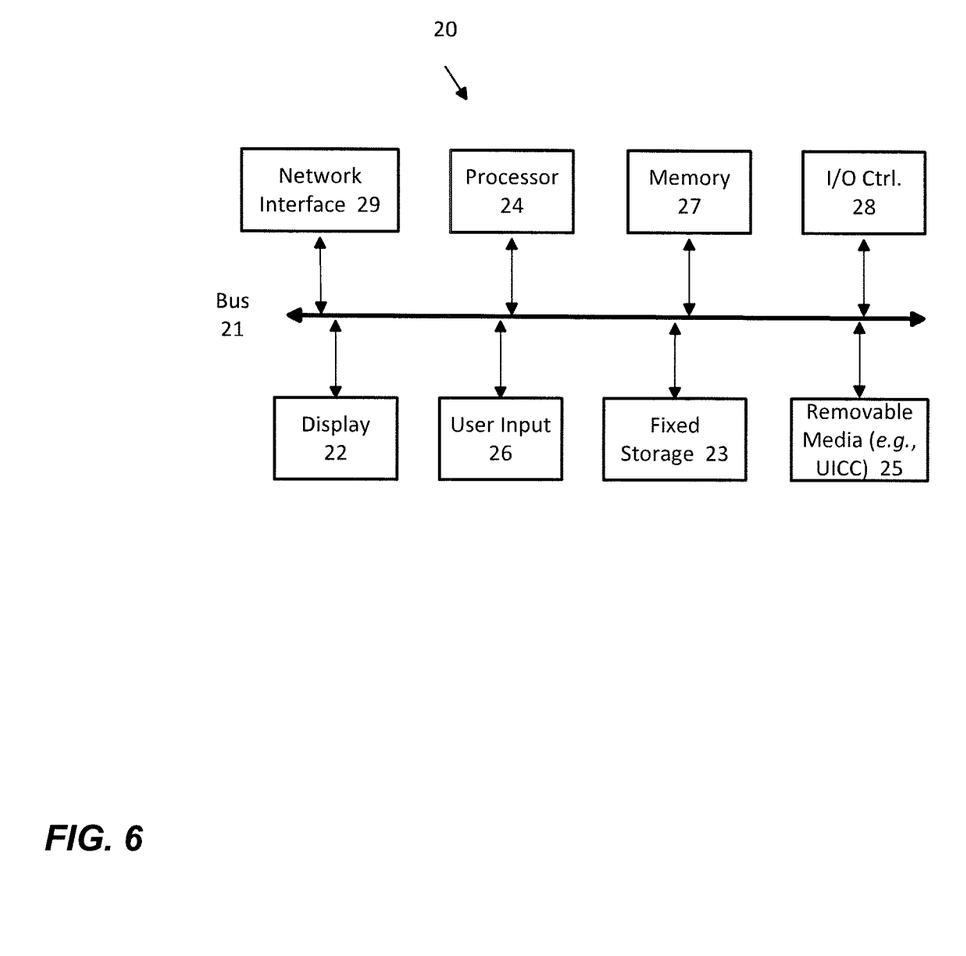
FIG. 6 is a schematic of an example computing device (e.g., server or mobile device) suitable for implementing embodiments of the presently disclosed subject matter.

Embodiments of the presently disclosed subject matter may be implemented in and used with a variety of component and network architectures. FIG. 6 is an example computing device 20 (e.g., electronic device such as a smartphone, tablet, laptop, mobile device, server) suitable for implementing embodiments of the presently disclosed subject matter. Computing device 20 includes a bus 21 which interconnects major components of the computer 20, such as a one or more processors 24 (illustrated here as a central processor), a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

In some configurations, a universal integrated-circuit card (UICC) may contain some of the components illustrated by the computing device 20 in FIG. 6. For example, the UICC may have a processor, memory (e.g., ROM, RAM, or the like) and an input/output controller. A UICC itself may not have a display, user input, removable media. The UICC may be removable media 25 that is inserted into a computing device 20 as illustrated in FIG. 6. Similarly a SIM card may be considered removable medium while an eSIM may be stored on memory 27 or fixed storage 23.

Bus 21 allows data communication between processor 24 and memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computing device 20 are generally stored on and accessed via a computer readable medium, such as a hard disk drive (e.g., fixed storage 23), an optical drive, floppy disk, or other storage medium 25.

Fixed storage 23 may be integral with computing device 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. Network interface 29 may provide such connection using wireless techniques, including digital cellular telephone connection, Cellular Digital Packet Data (CDPD) connection, digital satellite data connection, or the like. For example, network interface 29 may allow the computing device to communicate with other electronic devices via one or more local, wide-area, or other networks. Many other devices or components (not shown) may be connected in a similar manner (e.g., digital cameras or speakers). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of memory 27, fixed storage 23, removable media 25, or on a remote storage location.

Figure 7:
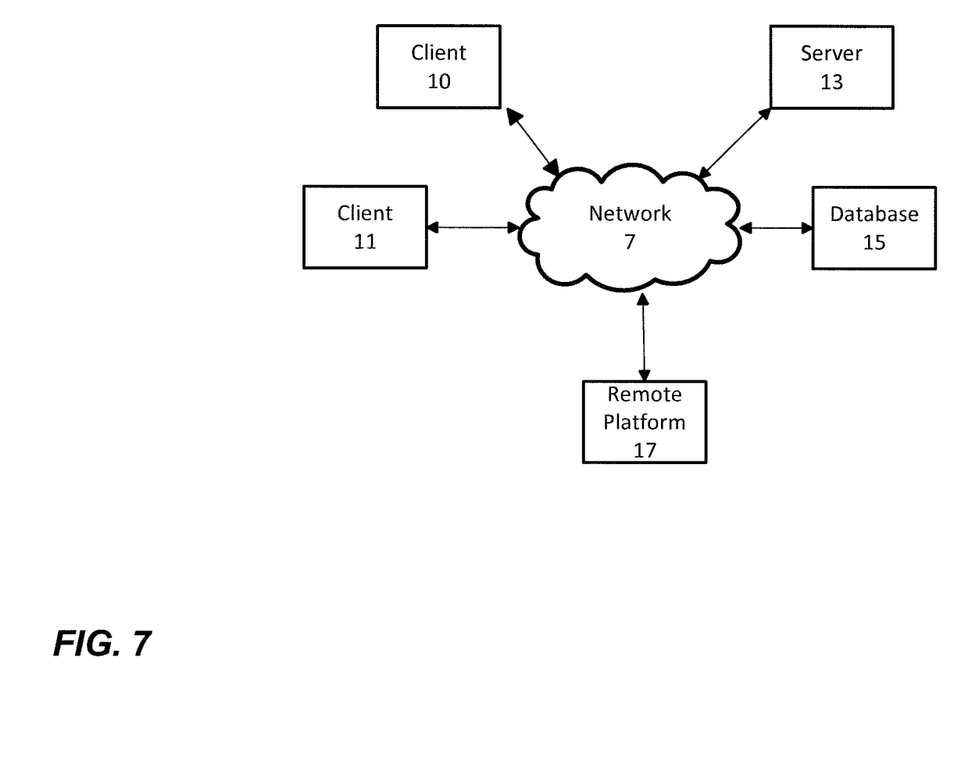
FIG. 7 shows an example network arrangement according to an embodiment of the disclosed subject matter.

FIG. 7 shows an example network arrangement according to an embodiment of the disclosed subject matter. One or more clients 10, 11, such as local computers, mobile devices, smartphones, tablet computing devices, and the like may connect to other devices via one or more networks 7. As described earlier, the communication partner may operate a client device that is remote from the device operated by the user (e.g., in separate locations). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by clients 10, 11, or one or more other devices may provide intermediary access such as where a server 13 provides access to resources stored in a database 15. Clients 10, 11 also may access remote platforms 17 or services provided by remote platforms 17 such as cloud computing arrangements and services. Remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system, comprising:
   a non-transitory memory configured to store data associated with a model for each of a plurality of mobile devices made by a manufacturer;
   one or more hardware processors coupled to the non-transitory memory and configured to read instructions from the non-transitory memory to cause the system to perform operations comprising:
   receiving an international mobile equipment identity (IMEI) from one of the plurality of mobile devices that identifies the model associated with the one of the plurality of mobile devices, the one of the plurality of mobile devices having at least one application that is unable to communicate with a server of a manufacturer of the one of the plurality of mobile devices;
   determining, by a provisioning server, that the at least one application is unable to communicate with the server of the manufacturer because the one of the plurality of mobile devices is depreciated based upon the received IMEI, wherein the provisioning server is separate from the server of the manufacturer and is configured to communicate with the one of the plurality of mobile devices;
   obtaining, by the provisioning server, a key unique to the one of the plurality of mobile devices; and
   transmitting to the one of the plurality of mobile devices the key obtained by the provisioning server, the key comprising at least one Access Point Name (APN), wherein the APN directs traffic from the one of the plurality of mobile devices to the server of the manufacturer.

2. The system of claim 1, wherein the key is obtained from a database of the manufacturer.

3. The system of claim 2, further comprising:
   transmitting, via an electronic network, a request to the manufacturer for the key unique to the one of the plurality of mobile devices, the request including an indication of the model of the one of the plurality of mobile devices and a unique identifier for the one of the plurality of mobile devices; and
   responsive to the request, receiving via the electronic network, the key from the manufacturer.

4. The system of claim 3, sending a payment request to a mobile network service provider, upon which the one of the plurality of mobile devices transmits and receives electronic communications, the payment request specifying a fee amount for successful retrieval of the key.

5. The system of claim 3, further comprising transmitting to the manufacturer an indication that the key is successfully downloaded.

6. The system of claim 3, wherein the electronic network comprises a virtual private network (VPN).

7. The system of claim 4, further comprising transmitting an electronic payment to the manufacturer comprising a portion of the fee amount.

8. The system of claim 1, further comprising sending a payment request to a mobile network service provider, upon which the one of the plurality of mobile devices transmits and receives electronic communications, the payment request specifying a fee amount based upon successful retrieval of the key.

9. The system of claim 1, wherein the determination that the one of the plurality of mobile devices is depreciated is based upon the model of the one of the plurality of mobile devices.

10. The system of claim 1, wherein the one of the plurality of mobile devices does not receive APN updates from the manufacturer of the one of the plurality of mobile devices.

11. The system of claim 1, further comprising receiving a request to register the one of the plurality of mobile devices on a mobile network of a mobile virtual network operator or a secondary or tertiary mobile service provider.

12. The system of claim 1, further comprising determining the model of the one of the plurality of mobile devices associated with the IMEI.

13. The system of claim 1, wherein the one of the plurality of mobile devices has a multimedia messaging service (MMS) application that is disabled due to the inability to communicate with the server of the manufacturer of the one of the plurality of mobile devices.

14. A computer-implemented method, comprising:
   receiving an international mobile equipment identity (IMEI) from a mobile device that identifies a model of the mobile device, the mobile device having at least one application that is unable to communicate with a server of a manufacturer of the mobile device;
   determining, by a provisioning server, that the at least one application is unable to communicate with the server of the manufacturer because the one of the plurality of mobile devices is depreciated based upon the received IMEI;

obtaining, by the provisioning server, a key unique to the mobile device, wherein the provisioning server is separate from the server of the manufacturer and is configured to communicate with the mobile device; and transmitting to the mobile device the key obtained by the provisioning server, the key comprising at least one Access Point Name (APN), wherein the APN directs traffic from the at least one application of the mobile device to the server of the manufacturer.

15. The computer-implemented method of claim 14, wherein the key is obtained from a database of the manufacturer.

16. The computer-implemented method of claim 15, further comprising:

transmitting, via an electronic network, a request to the manufacturer for the key unique to the mobile device, the request including an indication of at least one of the model of the mobile device and a unique identifier for the mobile device; and responsive to the request, receiving via the electronic network, the key from the manufacturer.

17. The computer-implemented method of claim 16, sending a payment request to a mobile network service provider, upon which the mobile device transmits and receives electronic communications, the payment request specifying a fee amount for successful retrieval of the key.

18. The computer-implemented method of claim 16, further comprising transmitting to the manufacturer an indication that the key is successfully downloaded.

19. The computer-implemented method of claim 17, further comprising transmitting an electronic payment to the manufacturer comprising a portion of the fee amount.

20. A non-transitory computer readable medium having stored thereon computer readable instructions that are executable to cause one or more processors to perform operations, comprising:

receiving an international mobile equipment identity (IMEI) from a mobile device that identifies a model of the mobile device, the mobile device having at least one application that is unable to communicate with a server of a manufacturer of the mobile device;

determining, by a provisioning server, that the at least one application is unable to communicate with the server of the manufacturer because the one of the plurality of mobile devices is depreciated based upon the IMEI;

obtaining, by the provisioning server, a key unique to the mobile device, wherein the provisioning server is separate from the server of the manufacturer and is configured to communicate with the mobile device; and transmitting to the mobile device the key obtained by the provisioning server, the key comprising at least one Access Point Name (APN), wherein the APN directs traffic from the at least one application of the mobile device to the server of the manufacturer.

* * * * *